United States Patent
Cui et al.

(10) Patent No.: US 11,384,504 B2
(45) Date of Patent: Jul. 12, 2022

(54) METHOD AND SYSTEM FOR DETERMINING IN REAL TIME BEARING CAPACITY OF FOUNDATION TAMPED BY HIGH-SPEED HYDRAULIC TAMPER

(71) Applicant: SHANDONG UNIVERSITY, Shandong (CN)

(72) Inventors: Xinzhuang Cui, Jinan (CN); Qing Jin, Jinan (CN); Jieru Wang, Jinan (CN); Yilin Wang, Jinan (CN); Jun Li, Jinan (CN); Xiaoning Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 122 days.

(21) Appl. No.: 17/042,612

(22) PCT Filed: Nov. 19, 2019

(86) PCT No.: PCT/CN2019/119525
§ 371 (c)(1),
(2) Date: Sep. 28, 2020

(87) PCT Pub. No.: WO2020/103838
PCT Pub. Date: May 28, 2020

(65) Prior Publication Data
US 2021/0032833 A1 Feb. 4, 2021

(30) Foreign Application Priority Data
Nov. 20, 2018 (CN) .......................... 201811386040.9

(51) Int. Cl.
*E02D 33/00* (2006.01)
*E01C 19/40* (2006.01)
(Continued)

(52) U.S. Cl.
CPC .............. *E02D 33/00* (2013.01); *E01C 19/40* (2013.01); *E01C 21/00* (2013.01); *E01C 23/01* (2013.01);
(Continued)

(58) Field of Classification Search
CPC .......... E01C 19/40; E01C 21/00; E01C 23/01; E02D 3/068; E02D 33/00; E02D 2600/10; G01P 15/09; G01S 19/01
(Continued)

(56) References Cited

U.S. PATENT DOCUMENTS 2,646,739 A * 7/1953 Rohr ...................... A01B 35/18
172/267
2004/0026380 A1* 2/2004 Holzgruber ............... C22B 9/18
219/73.1
(Continued)

FOREIGN PATENT DOCUMENTS

| CN | 104074181 A | 10/2014 |
| CN | 205804435 U | 12/2016 |

(Continued)

OTHER PUBLICATIONS

Feb. 12, 2020 International Search Report issued in International Patent Application No. PCT/CN2019/119525.
(Continued)

*Primary Examiner* — Raymond W Addie
(74) *Attorney, Agent, or Firm* — Oliff PLC

(57) ABSTRACT

A method and system determines in real time the bearing capacity of a foundation tamped by a high-speed hydraulic tamper. Four wireless acceleration sensors are arranged uniformly along tamping plate edges, sensor position tamping points are determined; the soil is tamped, the plate peak acceleration slows, tends to, and reaches stabilization in a range, a relationship curve between the tamping number and
(Continued)

plate peak acceleration is determined; different loads are applied to the foundation to obtain corresponding settlements, coordinate axes are established, points are drawn according to each test data group and sequentially connected with a smooth curve to obtain a settlement-load curve, and the curve is fitted; a tamping number and foundation bearing capacity relationship is obtained; the two relationship curves are combined to obtain a relationship curve, and the foundation bearing capacity magnitude at a certain moment during the tamping operation is determined by using the acceleration index.

9 Claims, 4 Drawing Sheets

(51) Int. Cl.
*E01C 21/00* (2006.01)
*E01C 23/01* (2006.01)
*E02D 3/068* (2006.01)
*G01P 15/09* (2006.01)
*G01S 19/01* (2010.01)

(52) U.S. Cl.
CPC .............. *E02D 3/068* (2013.01); *G01P 15/09* (2013.01); *G01S 19/01* (2013.01); *E02D 2600/10* (2013.01)

(58) Field of Classification Search
USPC .............................. 404/72, 75, 133.05–133.2
See application file for complete search history.

(56) References Cited

U.S. PATENT DOCUMENTS

| | | | |
|---|---|---|---|
| 2009/0208296 A1* | 8/2009 | Cook ........................ | E02D 3/02 405/271 |
| 2013/0058717 A1* | 3/2013 | Anderegg ............... | E02D 3/074 404/133.05 |
| 2016/0168806 A1* | 6/2016 | Corcoran ............... | E01C 19/288 701/50 |

FOREIGN PATENT DOCUMENTS

| | | |
|---|---|---|
| CN | 107843711 A | 3/2018 |
| CN | 207337183 U | 5/2018 |
| CN | 109339127 A | 2/2019 |
| JP | 4783701 B2 | 9/2011 |

OTHER PUBLICATIONS

Feb. 12, 2020 Written Opinion issued in International Patent Application No. PCT/CN2019/119525.

\* cited by examiner

METHOD AND SYSTEM FOR DETERMINING IN REAL TIME BEARING CAPACITY OF FOUNDATION TAMPED BY HIGH-SPEED HYDRAULIC TAMPER

FIELD OF THE INVENTION

The present invention relates to a method and system for determining in real time the bearing capacity of a foundation tamped by a high-speed hydraulic tamper.

BACKGROUND OF THE INVENTION

With the continuous development of infrastructure construction, the scales of foundation treatment projects have continued to expand, and the construction machinery is also increasingly developing toward intelligence and mechatronics. High-speed hydraulic tampers have been widely used in working blind areas of large tamping machinery such as earthwork corners and backfilling areas of bridges and culverts, and other types of foundation tamping projects such as parking lots, airports and highways, due to their good maneuverability, controllability and safety, thus meeting the requirements for single-point or continuous tamping of tamping working faces.

At present, a sampling inspection method is usually used in the hydraulic tamping construction process, and the quality is monitored through tamped actual indexes, that is, compactness, standard penetration number, etc., or the bearing capacity of a foundation is determined by bearing plate test. However, in large-scale foundation treatment projects, these methods are inefficient and have great potential safety hazards. Therefore, intelligent reform of hydraulic tampers using advanced technology and reasonable, efficient and accurate real-time monitoring of the soil tamping effect and the change trend of bearing capacity are of great significance for ensuring the tamping quality and improving the efficiency of tamping construction.

SUMMARY OF THE INVENTION

In order to solve the above problems, the present invention proposes a method and system for determining in real time the bearing capacity of a foundation tamped by a high-speed hydraulic tamper. The present invention can accurately position tamping points, remotely monitor the tamping effect of each point, save a lot of complicated tests after tamping, achieve high precision, and avoid the problems of low probability and low efficiency of manual sampling test.

In order to achieve the above objectives, the present invention adopts the following technical solution:

A method for determining in real time the bearing capacity of a foundation tamped by a high-speed hydraulic tamper includes the following steps:

arranging four wireless acceleration sensors uniformly along the edges of a tamping plate, and determining a position tamping point of each wireless acceleration sensor; tamping the soil several times with certain tamping energy, wherein the peak acceleration of the tamping plate changes from fast to slow, then gradually tends to be stable, and finally stabilizes in a range; determining a relationship curve between the number of tamping and the peak acceleration of the tamping plate;

applying different loads to the foundation to obtain corresponding settlements under the different loads, establishing coordinate axes using the settlements as horizontal coordinates and the loads as vertical coordinates, drawing points according to each group of test data, sequentially connecting the points with a smooth curve to obtain a settlement-load curve, and fitting the curve;

inversely calculating the magnitude of the bearing capacity of the foundation by using the corresponding tamping settlement under certain number of tamping to obtain a relationship between the number of tamping and the bearing capacity of the foundation; and combining the two relationship curves to obtain a relationship curve between the acceleration and the bearing capacity of the foundation, and determining the magnitude of the bearing capacity of the foundation at a certain moment during the tamping operation of the hydraulic tamper by using the acceleration index.

As a further limitation, the acceleration sensors are piezoelectric acceleration sensors.

As a further limitation, when the acceleration sensors are installed, four device embedding grooves having the same size as the sensors are reserved along the edges of the tamping plate, the around of four corners of the grooves are drilled and tapped, the four sensors are respectively welded to four installation substrates, four corners of the installation substrates are drilled at the positions adapted to the drilling positions of the grooves, the upper part of four grooves are covered with the substrates on which the sensors are installed and of which the underside are upward, and the substrates are fixed by bolts.

As a further limitation, heavy mechanical oil is smeared to four sides of the grooves before installation.

As a further limitation, the main sensitivity axes of the acceleration sensors and the direction of the measured impact load are aligned in a straight line during installation.

As a further limitation, the magnitude of the bearing capacity of the foundation at a certain moment during the tamping operation of the hydraulic tamper is determined by using the acceleration index.

As a further limitation, when the acceleration reaches a certain critical value, the corresponding bearing capacity of the foundation reaches its design value.

As a further limitation, the critical acceleration is used as a measurement index to continue tamping other tamping points on the same road section until the critical acceleration is reached.

A system for determining in real time the bearing capacity of a foundation tamped by a high-speed hydraulic tamper includes:

four wireless acceleration sensors arranged uniformly along the edges of a tamping plate, the wireless acceleration sensors receiving the change trends of peak accelerations of the tamping plate during tamping;

a global positioning system (GPS) is set in each wireless acceleration sensor to position a tamping point, and a remote processor simultaneously acquires position information of the tamping points and single-point accelerations of the tamping plate; and the processor, configured to receive the detection values of the wireless acceleration sensors, acquire the position information of the tamping points, acquire corresponding settlements under different loads, establish coordinate axes using the settlements as horizontal coordinates and the loads as vertical coordinates, draw points according to each group of test data, sequentially connect the points with a smooth curve to obtain a settlement-load curve, and fit the curve;

inversely calculate the magnitude of the bearing capacity of the foundation by using the corresponding tamping settlement under certain number of tamping to obtain a relationship between the number of tamping and the bearing capacity of the foundation; and combine the two relationship curves to obtain a relationship curve between the acceleration and the bearing capacity of the foundation, and determine the magnitude of the bearing capacity of the foundation at a certain moment during the tamping operation of the hydraulic tamper by using the acceleration index.

Compared with the prior art, the present invention has the following beneficial effects: The wireless acceleration sensors are convenient to install and use, support multiple network topologies, eliminate the intricacy of field wiring, avoid noise caused by cables, and have high measurement precision and strong anti-interference ability.

GPSs are embedded inside to accurately position tamping points. The remote processor simultaneously acquires position information of the tamping points and single-point accelerations of the tamping plate, so as to grasp in real time the operating status of the hydraulic tamper and the dynamic changes in the bearing capacity of the foundation reflected by the acceleration index.

Relationship curves between the acceleration and the number of tamping, the bearing capacity of the foundation and the number of tamping are established, and a relationship curve between the acceleration and the bearing capacity of the foundation is then fitted, thereby monitoring the tamping effect of foundation soil in real time by using the acceleration index, and judging whether the tamping operation needs to continue.

A lot of complicated tests after tamping are saved, high precision is achieved, the problems of low probability and low efficiency of manual sampling tests are avoided, and an effective treatment method is provided for quality control of foundation treatment projects.

BRIEF DESCRIPTION OF THE DRAWINGS

The accompanying drawings constituting a part of the present application are intended to provide a further understanding of the present application, and the illustrative embodiments of the present application and the descriptions thereof are intended to interpret the present application and do not constitute improper limitations to the present application.

DETAILED DESCRIPTION OF THE EMBODIMENTS

Figure 1:
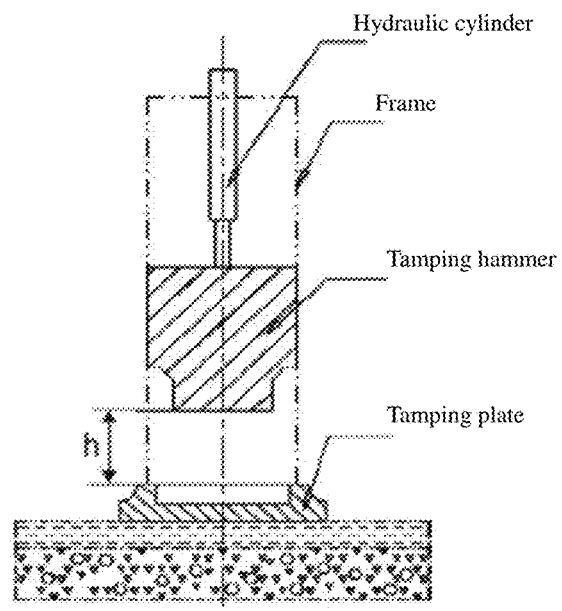
FIG. 1 is an operating principle diagram of a hydraulic tamper according to an embodiment.

The present invention will be further illustrated below in conjunction with the accompanying drawings and embodiments.

It should be noted that the following detailed descriptions are exemplary and are intended to provide further descriptions of the present application. All technical and scientific terms used herein have the same meaning as commonly understood by those of ordinary skill in the technical filed to which the present application belongs, unless otherwise indicated.

It should be noted that the terms used here are merely used for describing specific embodiments, but are not intended to limit the exemplary embodiments of the present invention. As used herein, unless otherwise clearly stated in the context, singular forms are also intended to include plural forms. In addition, it should also be understood that when the terms "comprise" and/or "include" are used in the description, it indicates the presence of features, steps, operations, devices, components, and/or combinations thereof.

In the present invention, the terms such as "upper", "lower", "left", "right", "front", "rear", "vertical", "horizontal", "side", and "bottom" indicate the orientations or positional relationships based on the orientations or positional relationships shown in the drawings, are only relationship terms determined for the convenience of describing the structural relationships of various components or elements of the present invention, but do not specify any component or element in the present invention, and cannot be understood as limitations to the present disclosure.

In the present invention, the terms such as "fixedly connected", "connected" and "coupled" should be generally understood, for example, may be fixedly connected, integrally connected, detachably connected, directly connected, or indirectly connected by a medium. For a related scientific research or technical person in this art, the specific meanings of the above terms in the present invention may be determined according to specific circumstances, and cannot be understood as limitations to the present invention.

The present invention provides a method for remotely monitoring the tamping effect of a foundation, where an acceleration sensor with a wireless data transmission module and a global positioning system (GPS) is installed on a tamping plate of a hydraulic tamper. By comparing the test data under various installation methods, the installation method with optimal frequency response characteristics is selected to ensure the accuracy of the measurement results. Relationship curves between the acceleration and the number of tamping and between the bearing capacity of the foundation and the number of tamping are established, and a relationship curve between the acceleration and the bearing capacity of the foundation is then fitted, thereby monitoring the tamping effect of foundation soil in real time by using the acceleration index, and judging whether the tamping operation needs to continue. At the same time, tamping points are accurately positioned by the GPS, and the tamping effect of each point is remotely monitored, thereby saving a lot of complicated tests after tamping, achieving high precision, avoiding the problems of low probability and low efficiency of manual sampling test, and providing an effective treatment method for quality control of foundation treatment projects.

The main principles based are:

(1) Operating Principle of High-Speed Hydraulic Tamper

High-speed hydraulic tamping can achieve continuous tamping by using an advanced hydraulic control system, and the magnitude and the times for the using of tamping energy can be set according to the site conditions. The operating principle is as shown in FIG. 1. A hydraulic cylinder lifts a tamping hammer to a certain height and releases the tamping hammer, the tamping hammer drops at a high speed and then tamps, through a buffer force transmission device, a tamping plate statically pressed on the soil surface of a measuring point, and the combined force of the tamping force and the gravity of the machine achieves the tamping effect on foundation soil.

(2) There are a series of complex dynamic response changes during the tamping of a foundation, which mainly involve two dynamic processes: ① collision between the tamping hammer and the tamping plate; and ② interaction between the tamping plate and the soil.

① The collision between the tamping hammer and the tamping plate: the tamping hammer drops quickly under the combined action of the hydraulic system and its own gravity, and tamps the tamping plate through the buffer device for force transmission. It is assumed that the mass of the tamping hammer is $m_1$, the mass of the tamping plate is $m_2$, and these two objects move on the same straight line and collide with each other. According to the principle of conservation of momentum, there is:

$$m_1 v_{11} + m_2 v_{21} = m_1 v_{12} + m_2 v_{22} \quad (1)$$

In the formula: $v_{11}$ is the initial speed of the tamping hammer; $v_{21}$ is the initial speed of the tamping plate; $v_{12}$ is the moving speed of the tamping hammer after the collision; and $v_{22}$ is the moving speed of the tamping plate after the collision.

$$k = \frac{v_{22} - v_{12}}{v_{21} - v_{11}}$$

is assumed to be a recovery coefficient. When k=0, it is a completely inelastic collision; when k=1, it is a completely elastic collision; and when 0≤k≤1, it is an incompletely elastic collision, and at this time, energy is lost due to mechanical friction, noise, heat, air resistance and the like, so the energy is non-conservative, but the momentum is conservative. For the tamping hammer, under the combined effect of its own gravity and the hydraulic system, at the moment before the collision with the tamping hammer, there is:

$$\tfrac{1}{2} m_1 v_{11}^2 = m_1 gh + u m_1 gh \quad (2)$$

In the formula: h is the drop height of the tamping hammer; g is a gravity acceleration; and μ is a force application coefficient of the hydraulic system.

At the moment before the tamping hammer collides with the tamping plate, $v_{21}=0$. Since the moment of collision is very short, the deformation of the soil can be ignored, the collision is a completely inelastic collision, $$k = \frac{v_{22} - v_{12}}{v_{21} - v_{11}} = 0, \text{ then } v_{12} = v_{22} = \frac{m_1 v_{11}}{m_1 + m_2},$$

and substituted with (2) to obtain $$v_{12} = v_{22} = \frac{m_1 v_{11}}{m_1 + m_2} = \frac{m_1}{m_1 + m_2} \sqrt{(1+u)gh} \quad (3)$$

$v_{12}$ or $v_{22}$ is the speed during the interaction of the tamping hammer and the tamping plate.

② The interaction between the tamping plate and the soil

Figure 2:
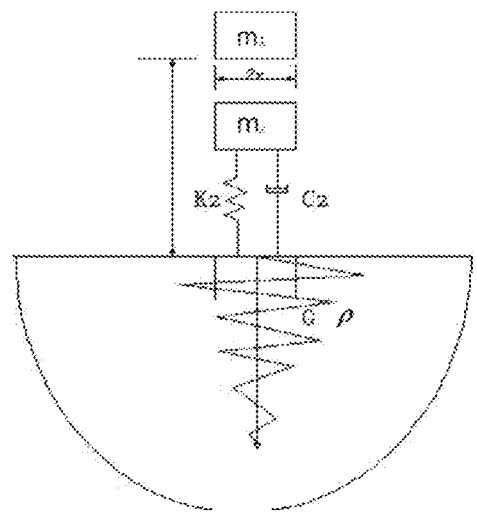
FIG. 2 is a mechanical model according to an embodiment.

The interaction between the tamping plate and the soil is regarded as a half-space tamping model of incompletely elastic collision. After colliding with the soil, the tamping plate acts on the soil at the speed $v_{22}$, thus tamping the soil. According to FIG. 2, an equation of motion is established:

$$m_z \ddot{Z}(t) + C_z \dot{Z}(t) + k_z Z(t) = G_0 \quad (4)$$

In the formula: Z(t) is the displacement of the tamping hammer; Z(t) is the displacement of the tamping plate; Z(t) is the acceleration of the tamping plate; $G_0$ is the impact force of the tamping hammer on the tamping plate; $C_z$, $k_z$ are respectively a vertical damping coefficient and a spring stiffness when the foundation is regarded as a damping-spring system, and their values are related to the shear modulus G of the soil, the Poisson's ratio λ of the soil and the radius of the tamping plate. Expressions thereof are:

$$k_z = \frac{4 r_0 G}{1-\lambda}, \quad C_z = \frac{\pi r_0^2 \sqrt{GP}}{1-\lambda} \quad (5)$$

The equations are solved according to vibration mechanics. The acceleration Z(t) of the tamping plate can be solved according to the boundary conditions based on the assumption of a circular frequency $$\varpi_n = \sqrt{\frac{k_z}{m_2}}$$

of an undamped system, a damping ratio $$\beta = \frac{C_z}{2\sqrt{k_z m_2}},$$

a parameter $$\xi = \frac{C_z}{2 m_2}$$

and a damped circular frequency $\overline{\omega}_d = \sqrt{1-\beta^2} \varpi_n$. Z(t) as the acceleration of the tamping plate not only considers relevant parameters of the tamping plate of the hydraulic tamper, such as area and mass, but also considers the properties of the soil, such as elastic modulus, Poisson's ratio and damping coefficient. Therefore, the index can be used to reflect the tamping effect of the soil during the operation of the hydraulic tamper, and then to predict the change of its bearing capacity.

(3) Operating Principle of Wireless Acceleration Sensor

The wireless acceleration sensor is an intelligent device that involves sensing, sampling, radio frequency and other fields. The wireless acceleration sensor converts the physical signal of acceleration into an electrical signal that is easy to measure, the electrical signal is amplified, filtered, and subjected to analog-to-digital conversion to obtain a digital signal, and finally, data is stored and displayed by a computer. Compared with an ordinary acceleration sensor, the wireless acceleration sensor is easy to install and use, supports multiple network topologies, eliminates the tediousness of field wiring, avoids noise caused by cables, and has high measurement precision and strong anti-interference ability. A GPS is embedded inside to accurately position a tamping point. A remote computer simultaneously acquires the position information of the tamping point and the single-point accelerations of the tamping plate, so as to grasp in real time the operating status of the hydraulic tamper and the dynamic changes in the bearing capacity of the foundation reflected by the acceleration index.

Specific implementation steps include:

(1) Selection of Acceleration Sensor Type

An acceleration sensor is an electronic device that can measure acceleration. Acceleration sensors made by traditional processes are difficult to meet the requirements of modern technology. Therefore, wireless micro-acceleration sensors made by emerging micro-machining technologies have emerged, mainly including various types of piezoresistive, capacitive, and piezoelectric.

a) For piezoresistive acceleration sensors, resistance measurement bridges are made of semiconductor materials by using the principle of a spring mass system, have high flexibility, can meet different measurement requirements, but are greatly affected by temperature.

b) The structural form of capacitive acceleration sensors also uses the spring mass system, where the mass block moves under acceleration to change the gap with a fixed electrode so as to change the capacitance. The capacitive acceleration sensors have the characteristics of high sensitivity, zero frequency response and environmental adaptability, but have the disadvantages of non-linear input and output of signals, limited range, high cost and limited scope of application.

c) The piezoelectric acceleration sensors also use the principle of a spring mass system, where the mass of a sensitive core is affected by the acceleration of vibration to generate a force proportional to the acceleration, and the piezoelectric material forms a charge signal proportional to the force along its surface after receiving this force. The piezoelectric acceleration sensors have been widely used because of their large dynamic range, wide frequency range and low interference from the outside. Compared with the former two acceleration sensors, the piezoelectric acceleration sensors have the biggest disadvantage that they can't measure the signals of zero frequency.

Based on the above conditions and considering the environmental factors of the construction site, a piezoelectric acceleration sensor is preferred.

(2) Selection of Installation Position and Installation and Debugging of Data Acquisition System The natural frequency of the sensor is related to hardness and mass. In order to ensure a high resonance frequency, the main sensitivity axis of the sensor and the direction of the measured impact load should be aligned in a straight line during installation. It is found by test tamping that certain relationships can be established between the parameters of the soil and the peak acceleration values of both the tamping plate and the tamping hammer, but the relationship curve of the tamping plate has good correlation. Therefore, it is more representative to reflect the tamping effect of the soil with the peak acceleration value of the tamping plate. Four acceleration sensors are arranged uniformly along the edges of the tamping plate to avoid accidental errors, and the measurement results are averaged (the tamping plate has sufficient stiffness).

The wireless acceleration sensor is actually a system that integrates a data acquisition module centered on acceleration, a data pre-processing module centered on a microprocessor, a wireless transmission module centered on a radio frequency chip, and a micro-battery energy module, and packages the modules in a housing. Client configuration, system installation, data source setting, database change and data source test are sequentially performed in a notebook computer through wireless communication, and finally, the system is double clicked to run.

(3) Trial Tamping to Determine an Installation Method

Figure 3:
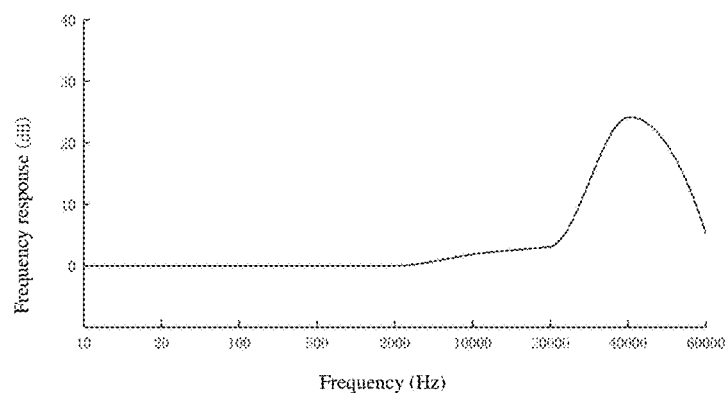
FIG. 3 is a frequency response curve of bolt installation according to an embodiment.
Figure 4:
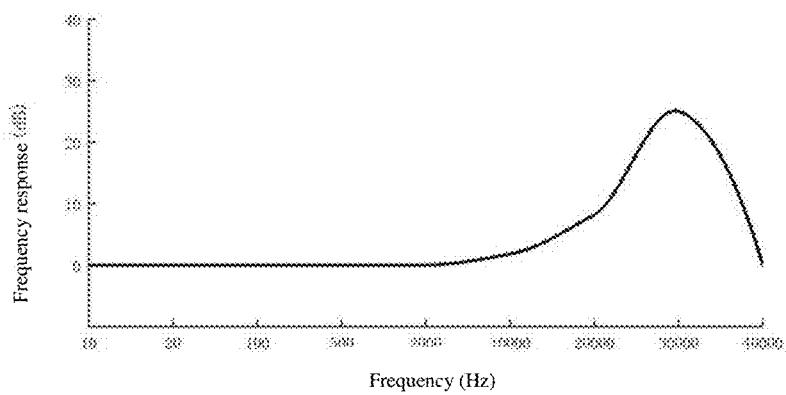
FIG. 4 is a frequency response curve of high-strength adhesive installation according to an embodiment.
Figure 5:
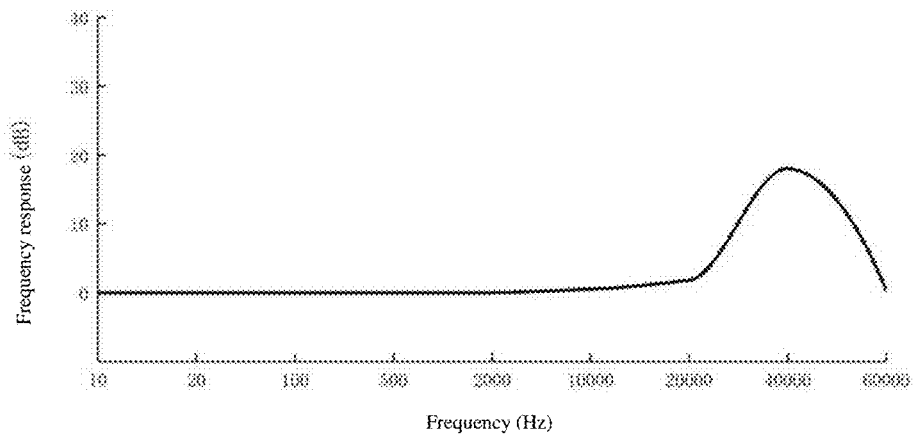
FIG. 5 is a frequency response curve of permanent magnet attraction installation according to an embodiment.

During the tamping process, a strong impact load will be generated. In order to obtain a higher installation resonance frequency, the acceleration sensor is required to be in good contact with the test point, and the resonance frequency of the installation is required to be more than 5 to 10 times the measured signal, without sliding in the horizontal or vertical direction. Any installation method that can affect its characteristics will change the natural frequency. At present, the following four achievable installation methods are tested:

a) The sensor is installed on the tamping plate by using different installation methods respectively.

b) A controller outputs scanning signals of 10 Hz to 40000 Hz in a self-closed loop mode at normal temperature.

c) Data is acquired to obtain frequency response characteristics under different installation methods. The specific results are shown in FIGS. 3-5.

Comparison of characteristics of three installation methods:

| Number | Installation method | Advantage | Disadvantage |
| --- | --- | --- | --- |
| 1 | Screw installation | Good frequency response, high sensitivity, easy to disassemble and maintain | Difficult drilling, tedious operation of installation equipment |
| 2 | High-strength adhesive | Good frequency response, convenient and easy to operate | Poor firmness, not suitable for impact measurement, not easy to reuse |
| 3 | Attraction with a permanent magnet | Simple and easy to operate, suitable for occasions where test points are frequently changed | Loss of part of frequency response |

Figure 6:
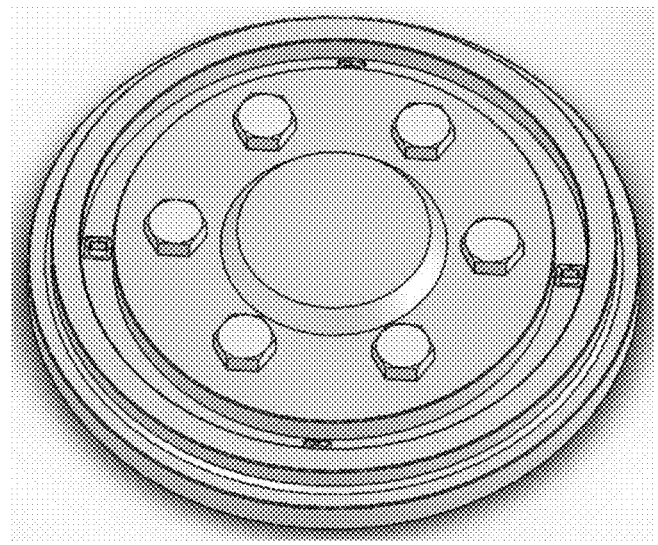
FIG. 6 is a schematic diagram of a tamping plate reserved with square grooves according to an embodiment.
Figure 7:
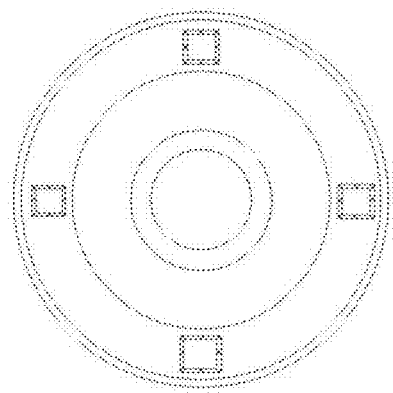
FIG. 7 is a schematic top view according to an embodiment.
Figure 8:
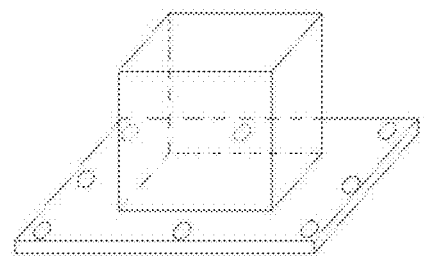
FIG. 8 is a schematic diagram showing that a sensor is welded to an installation substrate according to an embodiment.

Due to large transient energy during impact, the connection between the sensor and the tamping plate must be quite reliable. Rigid screw connection is preferred. The specific installation steps are as follows:

a) Four device embedding grooves having the same dimensions as the sensors are reserved along the edges of the tamping plate, and heavy mechanical oil is smeared to four sides of the grooves to improve the coupling effect and accurately measure high frequency response;

b) The around of four corners of the grooves are drilled and tapped;

c) Four sensors are respectively welded to four installation substrates, and the four corners of the installation substrates are drilled;

d) The upper part of four grooves are covered with the substrates on which the sensors are installed and of which the back sides are upward, and the substrates are fixed by insulating studs. Thus, gaps are avoided (the tamping plate is prevented from sinking into the soil to damage the sensors when the soil is soft). The installation model is shown in FIGS. 6-8.

(5) Relationship Curve Between Number of Tamping and Peak Acceleration of the Tamping Plate The soil is tamped 20 times with certain tamping energy, and the peak acceleration of the tamping plate changes from fast to slow, then gradually tends to be stable, and finally stabilizes in a small range.

(6) Relationship Between Number of Tamping and Bearing Capacity of the Foundation a) According to the test standards of static load of the foundation, a static load test is performed on site: different loads p are applied to the foundation to obtain corresponding settlements s under the different loads, coordinate axes are established using the settlements s as horizontal coordinates and the loads p as vertical coordinates, and points are drawn according to each group of test data and sequentially connected with a smooth curve to obtain an s-p curve. The curve is fitted with $p=a+bs+cs^2+ds^3$ to obtain fitting parameters a, b, c, d, the correlation coefficient $R^2$ is 0.99, and the fitting effect is good. Therefore, the magnitude of the bearing capacity of the foundation can be inversely calculated from the known tamping settlement.

b) The relationship between the tamping settlements and the number of tamping after each tamping is recorded;

c) The magnitude of the bearing capacity of the foundation is inversely calculated according to the drawn p-s curve by using the corresponding tamping settlement under certain number of tamping, thus obtaining a relationship between the number of tamping and the bearing capacity of the foundation.

Figure 9:
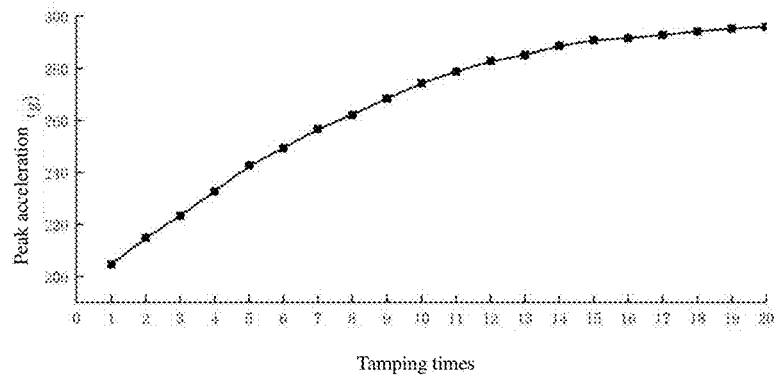
FIG. 9 is a relationship curve between the number of tamping and the peak acceleration of the tamping plate according to an embodiment.
Figure 10:
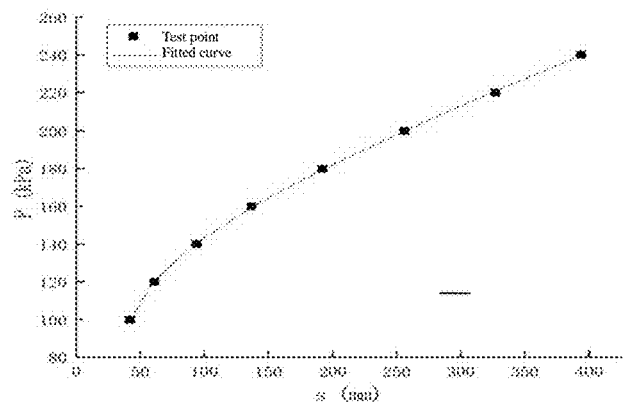
FIG. 10 is a p-s curve of a static load test according to an embodiment.
Figure 11:
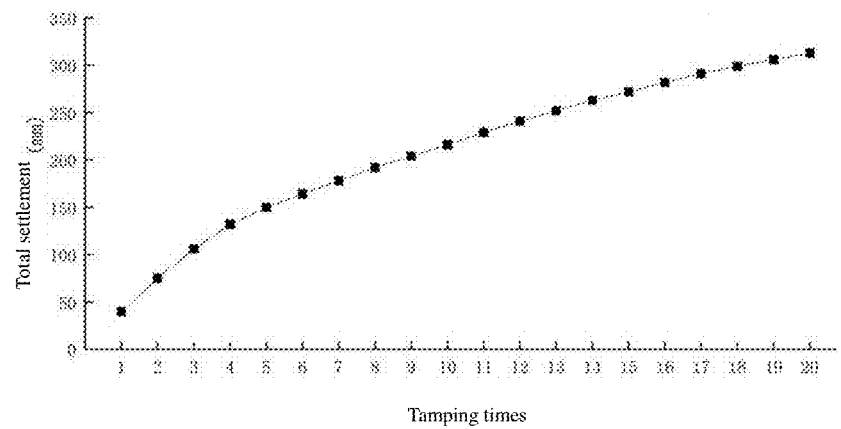
FIG. 11 is a relationship curve between the tamping settlement and the number of tamping according to an embodiment.
Figure 12:
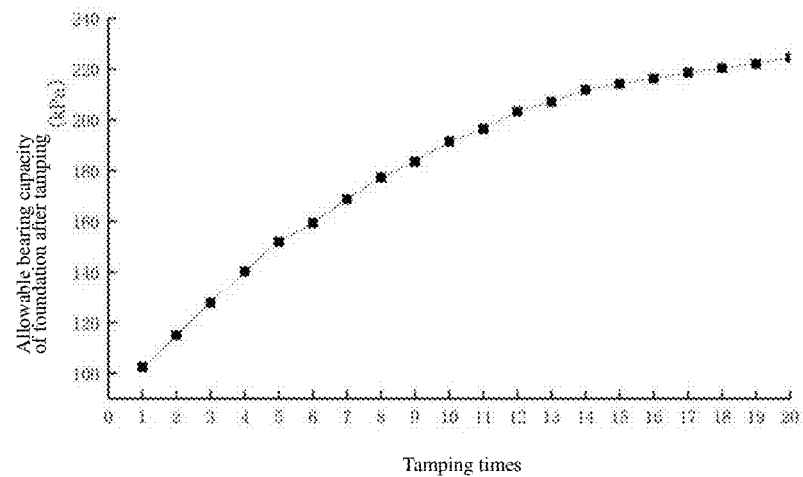
FIG. 12 is a relationship curve between the number of tamping and the bearing capacity of the foundation according to an embodiment.
Figure 13:
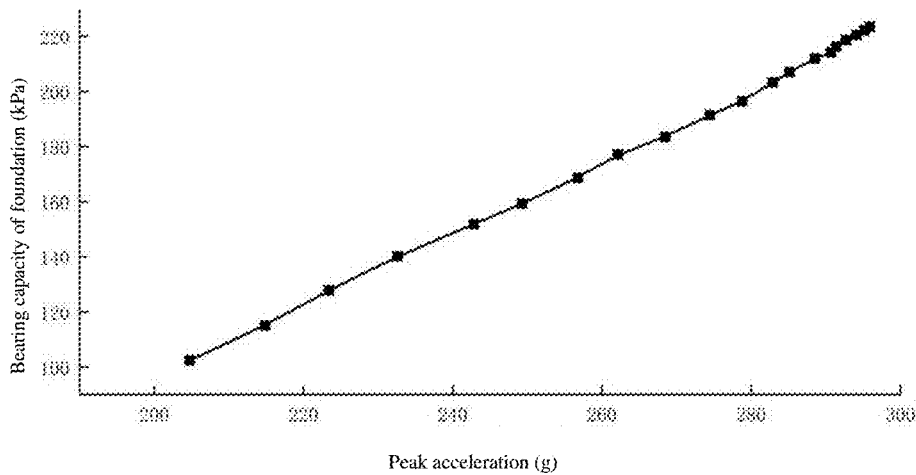
FIG. 13 is a relationship curve between the bearing capacity of the foundation and the acceleration according to an embodiment.

(7) Relationship Curve Between Bearing Capacity of the Foundation and Acceleration A relationship curve between the acceleration and the bearing capacity of the foundation can be obtained according to FIG. 9 and FIG. 12. Through this relationship, the magnitude of the bearing capacity of the foundation at a certain moment during the tamping operation of the hydraulic tamper can be determined by using the acceleration index. When the acceleration reaches a certain critical value, the corresponding bearing capacity of the foundation reaches its design value, so this critical acceleration can be used as a measurement index to continue to tamp other tamping points of the same road section, which can greatly improve the efficiency of tamping.

Example 1

Taking the monitoring of tamping quality of backfill soil at a highway abutment as a test point, the present invention is used to determine the change in the bearing capacity of a foundation during the tamping process of a high-speed hydraulic tamper. The backfill soil is 1-2 m deep, the impact energy of the hydraulic tamper is set to 50 kJ, and the design value of the bearing capacity of the foundation is 180 kPa. Facilities required for the test are: hydraulic tamper with the commercial brand of Tamshen from Tai'an Evergrande, pressure bearing plate, data acquisition instrument, and notebook computer.

The steps of determining the bearing capacity of the foundation through the acceleration index are as follows:

1. Installation of Acceleration Sensors and Data Acquisition Systems Thereof.

(1) On the tamping plate, four grooves having the same size as the sensors are formed along the edge in a "cross shape", and the around of four corners of the grooves are drilled;

(2) The acceleration sensors are welded to installation substrates, and the installation substrates are drilled with holes (having the same size as in step (1));

(3) Heavy mechanical oil is smeared to the four sides of the grooves;

(4) The grooves are covered with the installation substrates to which the acceleration sensors are welded and of which the back sides are upward, and the installation substrates are fixed by insulating studs to avoid gaps.

(5) Client configuration, system installation, data source setting, database change and data source test are performed in the computer, and finally, perform double clicking to run.

2. Establishment of a Relationship Between the Peak Acceleration of the Tamping Plate and the Number of Tamping The soil is tamped 20 times with 50 kJ tamping energy, and the peak acceleration of the tamping plate and the number of tamping are recorded.

3. Analysis on the Relationship Between the Bearing Capacity of the Foundation and the Number of Tamping (1) According to the test standards of static load of the foundation, a static load test is performed on site: different loads p are applied to the foundation to obtain corresponding settlements s under different loads, and a p-s curve is drawn;

(2) The relationship between the tamping settlement and the number of tamping after each tamping is recorded;

(3) The magnitude of the bearing capacity of the foundation is inversely calculated according to the drawn p-s curve by using the corresponding tamping settlement under certain number of tamping, thus obtaining a corresponding relationship between the number of tamping and the bearing capacity of the foundation.

4. Establishment of a Relationship Between the Bearing Capacity of the Foundation and the Acceleration A relationship between the bearing capacity of the foundation and the peak acceleration is established according to the relationship between the bearing capacity of the foundation and the number of tamping and the relationship between the peak acceleration and the number of tamping. According to this relationship, it can be known that when the acceleration reaches 262 g, the bearing capacity of the foundation reaches the design value 180 kPa, and the tamping can be stopped. Therefore, it can be said that when the acceleration reaches this critical value, the bearing capacity of the foundation reaches the design value, so this critical acceleration can be used as a measurement index to continue to tamp other tamping points of the same road section, which greatly improves the efficiency of tamping.

Described above are merely preferred embodiments of the present application, and the present application is not limited thereto. Various modifications and variations may be made to the present application for those skilled in the art. Any modifications, equivalent substitutions, improvements and the like made within the spirit and principle of the present application shall fall within the scope of the present application.

Although the specific embodiments of the present invention are described above in combination with the accompanying drawing, the protection scope of the present invention is not limited thereto. It should be understood by those skilled in the art that various modifications or variations could be made by those skilled in the art based on the technical solution of the present invention without any creative effort, and these modifications or variations shall fall into the protection scope of the present invention.

The invention claimed is:

1. A method for determining in real time bearing capacity of a foundation tamped by a high-speed hydraulic tamper, comprising the following steps:
arranging four wireless acceleration sensors uniformly along edges of a tamping plate, and determining a position tamping point of each wireless acceleration sensor;
tamping soil multiple times with certain tamping energy, wherein a peak acceleration of the tamping plate changes from fast to slow, then gradually tends to be stable, and finally stabilizes in a range; determining a relationship curve between a number of tamping and the peak acceleration of the tamping plate;
applying different loads to foundation to obtain corresponding settlements under different loads, establishing coordinate axes using the settlements as horizontal coordinates and the loads as vertical coordinates, drawing points according to each group of test data, sequentially connecting the points with a smooth curve to obtain a settlement-load curve, and fitting the curve;
inversely calculating bearing capacity of the foundation by using a corresponding settlement under certain number of tamping to obtain a relationship between the number of tamping and the bearing capacity of the foundation; and
establishing a relationship curve between the acceleration and the number of tamping, and a relationship curve between the bearing capacity of the foundation and the number of tamping, combining the two relationship curves to fit a relationship curve between the acceleration and the bearing capacity of the foundation, and determining the bearing capacity of the foundation at a certain moment during tamping operation of the hydraulic tamper by using the acceleration index.

2. The method for determining in real time the bearing capacity of a foundation tamped by a high-speed hydraulic tamper according to claim 1, wherein the acceleration sensors are piezoelectric acceleration sensors.

3. The method for determining in real time the bearing capacity of a foundation tamped by a high-speed hydraulic tamper according to claim 1, wherein when the acceleration sensors are installed, four device embedding grooves having the same size as the sensors are reserved along edges of the tamping plate, sides of four corners of the grooves are drilled and tapped, four sensors are respectively welded to four installation substrates, four corners of the installation substrates are drilled at positions adapted to the drilling positions of the grooves, the upper part of the four grooves are covered with the substrates on which the sensors are installed and of which back sides are upward, and the substrates are fixed by bolts.

4. The method for determining in real time the bearing capacity of a foundation tamped by a high-speed hydraulic tamper according to claim 1, wherein heavy mechanical oil is smeared to around of the grooves before installation.

5. The method for determining in real time the bearing capacity of a foundation tamped by a high-speed hydraulic tamper according to claim 1, wherein main sensitivity axes of the acceleration sensors and direction of the measured impact load are aligned in a straight line during installation.

6. The method for determining in real time the bearing capacity of a foundation tamped by a high-speed hydraulic tamper according to claim 1, wherein the bearing capacity of the foundation at a certain moment during the tamping operation of the hydraulic tamper is determined by using the acceleration index.

7. The method for determining in real time the bearing capacity of a foundation tamped by a high-speed hydraulic tamper according to claim 1, wherein when the acceleration reaches a certain critical value, the corresponding bearing capacity of the foundation reaches its design value.

8. The method for determining in real time the bearing capacity of a foundation tamped by a high-speed hydraulic tamper according to claim 1, wherein the critical acceleration is used as a measurement index to continue tamping other tamping points on a same road section.

9. A system for determining in real time the bearing capacity of a foundation tamped by a high-speed hydraulic tamper, comprising:
four wireless acceleration sensors arranged uniformly along the edges of a tamping plate, the wireless acceleration sensors receiving the change trends of peak accelerations of the tamping plate during tamping;
a global positioning system (GPS) is set in each wireless acceleration sensor to position a tamping point, and a remote processor simultaneously acquires position information of the tamping points and single-point accelerations of the tamping plate; and
the processor, configured to receive detection values of the wireless acceleration sensors, acquire position information of the tamping points, acquire corresponding settlements under different loads, establish coordinate axes using the settlements as horizontal coordinates and the loads as vertical coordinates, draw points according to each group of test data, sequentially connect the points with a smooth curve to obtain a settlement-load curve, and fit the curve;
inversely calculate the bearing capacity of the foundation by using the corresponding tamping settlement under certain number of tamping to obtain a relationship between the number of tamping and the bearing capacity of the foundation; and
establish relationship curves between the acceleration and the number of tamping and between the bearing capacity of the foundation and the number of tamping, combine the two relationship curves to fit a relationship curve between the acceleration and the bearing capacity of the foundation, and determine the magnitude of the bearing capacity of the foundation at a certain moment during the tamping operation of the hydraulic tamper by using the acceleration index.

* * * * *